United States Patent [19]

Summers

[11] Patent Number: 4,887,620
[45] Date of Patent: Dec. 19, 1989

[54] COMPOSITION AND METHOD TO PROVIDE ORGANOLEPTIC BITE IN A COMPOSITION FOR HUMAN CONSUMPTION

[75] Inventor: John K. Summers, Anderson, Ind.

[73] Assignee: Better Life International, Inc., Stuart, Fla.

[21] Appl. No.: 186,395

[22] Filed: Apr. 26, 1988

[51] Int. Cl.$^4$ ............................................. A24B 15/30
[52] U.S. Cl. .................................. 131/352; 131/359; 131/369; 131/275
[58] Field of Search ................ 131/352, 359, 369, 275

[56] References Cited

U.S. PATENT DOCUMENTS 2,930,720  3/1960  Finberg .
3,067,068  12/1962  Finberg .
3,112,754  12/1963  Diaz .
3,323,524  6/1967  Shamberger, Jr. .
4,696,315  9/1987  Summers .

FOREIGN PATENT DOCUMENTS 842 of 1766 United Kingdom .

Primary Examiner—V. Millin
Attorney, Agent, or Firm—Hoffmann & Baron

[57] ABSTRACT

A composition and method for providing a sustained organoleptic bit sensation to the oral cavity which includes the use of cayenne pepper ground to a fine texture of from about #30 Duraloy (#20 U.S.) to about #58 Duraloy (#48 U.S.), the pepper preferably having a heat content of from about 10,000 to about 40,000 BTU's. When used in a tobaccoless chew or snuff composition to approximate the bite of a tobacco composition, the pepper is preferably added in two stages, a first portion to the base mixture before encasing it, and a second portion applied as a top dressing after encasing the base mixture.

22 Claims, No Drawings

COMPOSITION AND METHOD TO PROVIDE ORGANOLEPTIC BITE IN A COMPOSITION FOR HUMAN CONSUMPTION

BACKGROUND OF THE INVENTION

The present invention is concerned with providing a desired organoleptic quality in compositions which are consumed or used in the mouth, and, in particular, it is directed to providing a organoleptic bite quality to such compositions.

In recent history it has been known to provide compositions which are to be ingested or used in the oral cavity with ingredients or combinations of ingredients to achieve various organoleptic effects. In the case of food items, such ingredients or combinations of ingredients need only provide a temporary effect since the food product is digested and does not, necessarily, remain for extended periods of time in the oral cavity. With regard to those compositions which are destined for extended resident time in the oral cavity, however, the ingredient must be incorporated in a way to provide a sustained sensation.

In the case of chewing gums, for example, which are retained in the oral cavity usually for extended periods of time, ingredients must be incorporated in amounts and in a manner whereby the desired organoleptic sensation is retained over the period of time of use by the consumer. Thus, sweeteners, acidulants, flavorants, and other sensation-producing components can be incorporated, for example, as an encapsulated ingredient(s) dispersed throughout the gum matrix or base so that the overall sensation is sustained for a period of time.

More recently, public attention has been directed to other compositions which are used for extended periods of time in the oral cavity such as tobacco chew and snuff material, basically because of the ill effects experienced through the use of nicotine-containing material. To this end, recently issued U.S. Pat. No. 4,696,315 assigned to the same assignee as in the present application as well as pending U.S. patent application Ser. No. 907,402 also commonly assigned to the assignee herein, are directed to providing tobaccoless chewing and snuff compositions to ameliorate the harmful effects associated with addictive use of tobacco-containing chewing and snuff compositions. These disclosures are incorporated herein by reference as if fully set forth.

Other references directed to reducing the use of nicotine by decreasing the amount of nicotine-containing material are U.S. Pat. No. 2,930,720 and U.S. Pat. No. 3,067,068, both to Finberg, which disclose smoking and snuff compositions which are substantially nicotine-free. Both of these disclosures include use of non-tobacco leaves, namely papaya leaves.

Other patents relating to nicotine problem include U.S. Pat. Nos. 3,112,754; 3,323,524 as well as British Patent No. 842 granted in 1766.

It is important that those compositions which are intended to replace nicotine-containing material or tobacco, possess as nearly as possible the same organoleptic sensations so that the user will be encouraged to use the substitute in place of the tobacco-containing substance. Thus in order to approximate as nearly as possible the oral sensation of tobacco in mucosal tissue, it is desirable to provide the sensation commonly referred to as organoleptic bite found in the tobacco-containing materials. This organoleptic sensation can be difficult to produce, since an increase in additives which provide a bite can create an undesirably high intensity burning sensation and hot spots in the compositions.

However, as a result of the present invention the above-describe problems and other problems relating to providing an organoleptic bite sensation have been overcome.

SUMMARY OF THE INVENTION

The present invention is a composition and a procedure for providing a sustained organoleptic bite sensation which includes the use of cayenne pepper ground to a size which is from about #30 Duraloy (#20 U.S.) to about #58 Duraloy (#48 U.S.), and is preferably about #54 Duraloy (#45 U.S.). The pepper also preferably has a selected heat content, between about 10,000 and 40,000 BTU's, and preferably about 20,000 BTU's. This particular heat content in combination with the size of pepper prescribed herein is highly desirable since it is possible to use a sufficient amount of the pepper throughout the composition to provide a sustained bite sensation without unwanted hot spots which dissipate quickly in the oral cavity.

This invention is particularly useful when used with tobaccoless chewing or snuff formulations in order to approximate the bite sensation of a tobacco-containing composition. When used in a nicotine-free herb which is a replacement for a tobacco-containing chew or snuff composition, the pepper is preferably added in two portions, the first portion being added to the base mixture of herbs prior to encasing it in a casing material, which usually includes a humectant, preservative, and binder. The chewing or snuff composition can then be further enhanced by applying the second portion of the pepper in a top dressing mixture which can be sprinkled on the composition after it has been encased and, preferably, after it has been bulked by storage at selected temperature and humidity conditions.

It has been found that the pepper is preferably included in a tobaccoless chewing or snuff composition in an amount from about 0.0001% to about 0.005%. When the pepper is added in the two portions as specified above, from about 20 to about 30% of the total amount of pepper should be added in the base material, and preferably about 25%, while from about 70 to about 80% of the total pepper should be included in the top dressing, and preferably about 75%. In this way it has been found that an initial burst of bite or burn sensation can be provided to the oral cavity of the user, while a sustained bite approximating the presence of a tobacco-containing composition is achieved.

In order to provide an adequate distribution in the base and top dressing, it is preferred to include a distributing agent, such as red clover powder as a component along with the pepper. In this way, not only is the pepper substantially evenly distributed, but it is also bulked to an amount which can be easily handled and applied to bulk mixtures. When used with such a distributing agent, the pepper-containing top dressing can be applied conveniently by sprinkling after encasing, and preferably after also bulking the base mixture.

As a result of the present invention, a nicotine-free chew or snuff composition can be provided which has an organoleptic bite sensation approximating that of a tobacco-containing composition. Moreover, the composition can be provided which has an initial burst of the bite sensation as well as a sustained bite or burn sensation for a long period of time. These effects can be provided without having a high intensity bite which would detract from the product. Furthermore, a composition can be provided which not only has the desired level of bite, but also one which can be evenly distributed throughout the composition such that there are no hot spots with uneven high intensity bite or burning sensation.

DETAILED DESCRIPTION OF THE INVENTION

The present invention includes a composition and method of providing an organoleptic bite or burning sensation, whereby, among other things, it is possible to approximate in a tobaccoless chewing or snuff composition, the desired herbal sensation in the mucosal tissue similar to that experienced through the use of tobacco/snuff chews. Moreover this can be provided to the tobaccoless composition without the harmful or detrimental effect of nicotine-containing composition.

Basically the herbal ingredient used to produce the bite in such compositions is capsicum pepper which comes from either *Capsicum annum L.* or the *Capsicum frutescent L.*, with additional species including *Capsicum Chinese, Capsicum Pendulum, Capsicum pubscenna,* and *Capsicum Minimum.* The capsicum genus is a herbaceous annual which can impart a pungency and color to selected commercial products. The chemical composition of the capsicum species includes fixed oil, pungent principles, volatile oil and carotenoid, mostly capsanthin. The pungency of the capsicum varies with the concentration of capsaicinoids.

Inasmuch as the different capsicum (cayenne) contain various levels of BTU's (heat units) depending on the species, area of cultivation, etc., it is important to provide an appropriate heat level which is usable in the composition. This can present a problem since the use of a high BTU capsicum can result in an overload or unwanted excessive burning sensation. Key to the inclusion of the cayenne in the product is that it should be substantially dispersed throughout the composition. Accordingly, it is necessary to provide a BTU value low enough so that a sufficient amount of the cayenne can be included while taking care to prevent exposure to an unnecessarily high burning sensation. The levels of heat characteristic of capsicum range from about 5,000 BTU's to about 100,000 BTU's with the ideal range in the present invention being from 10,000 to about 40,000, and preferably about 20,000 BTU's. This level enables better raw material distribution in the finished product. The tolerance levels for the desired results should be not more than plus or minus 10% BTU's. These levels can be carefully measured by means of the Scobal test.

The preferred compositions in one aspect of the present invention include those products described and claimed in issued U.S. Pat. No. 4,696,315 and co-pending U.S. patent application Ser. No. 907,402, both of which are assigned to the present assignee. Utilizing those compositions, the present product can contain a base and a finish material. The base materials in the case of snuff can include red clover cut and sifted finely, red clover powder, slippery elm bark powder, marshmallow (althea) root of powder, and very small amounts of cayenne (capsicum) pepper. This base material is then encased in an encasing material which can include bicarbonate of soda, ammonium chloride, sweeteners, salt, molasses, glycerin and water which are combined and carefully blended. The level of pepper used in the production of the base can vary from about 0.0001% to about 0.005% by weight of the finished product, with a preferred level of not more than about 0.0002%. In production the capsicum powder is combined and blended with the red clover powder, which acts as a distribution or dispersing agent, slippery elm powder and althea root powder for even distribution. The amount of capsicum powder used in the base can vary, but preferably about 25% of the total amount of cayenne used in the entire composition is included in the base.

Other ingredients used in variations of this product have been set forth in the above-referenced related cases.

The second part of the product can be referred to as the flavorant, and the top dressing. This dressing can consist of a carefully blended composition of capsicum (cayenne) powder and red clover powder, used as a distribution agent. The ratio of the distribution agent is preferably from about 2 to about 12 parts to 1 part of capsicum powder, and is ideally included in an amount from about 10 parts of distribution agent to 1 part of cayenne. The amount of capsicum powder used in the "top dressing" can vary, but is preferably in the neighborhood of about 75% of the total amount of the pepper that is used in the entire composition. It is important to note that the level of pepper can vary with the types of flavorings and other ingredients used in the different products.

Experiments have been conducted with dried capsicum (cayenne) fruits, by preparing chunks, flakes, or powder. By using special high RPM milling equipment, and by screening the consistency of the powder can be varied from a coarse grind to a very fine grind. The ideal levels of grind in the present invention according to the screen size are from about #30 Duraloy (equivalent to U.S. #20) to about #58 Duraloy (equivalent to #48 U.S.), with about #54 Duraloy (equivalent to U.S. #45) as the most preferred grind. This fine talcum-like powder has been found to be especially useful in providing the desired initial and sustained bite which is necessary in the snuff and chew compositions of the present invention.

Samples prepared with the ingredients listed above in accordance with the related references cited herein, resulted in a very even, non-irritating bite. The product had an immediate surface bite, and the amount of capsicum (cayenne) powder used in the base material resulted in maintenance of a bite approximating that of a tobacco-containing product for approximately 20 to 30 minutes of the chewing or residence time in oral cavity. This results in simulating a sensation very close to that of chewing tobacco products.

Thus, while the preferred embodiments of the present invention have been set forth above, it is believed that other changes and modifications be made to the present invention without departing from the scope thereof, and it is intended to include all such changes and modifications as come within the true scope of the invention.

I claim:

1. A chewing and/or snuff composition including a nicotine-free herb capable of being encased and capable of being processed to a texture which is non-injurious to the surface of the oral cavity, and a casing material for combining with said herb which maintains said herb is a moist coherent cud during chewing comprising:

cayenne pepper having a particle size with level of grind from about #30 Duraloy (#20 U.S.) to about

58 Duraloy (#48 U.S.) in an amount sufficient to approximate the bite sensation of a tobacco-containing chewing composition.

2. The chewing composition of claim 1 wherein said grind is about #54 Duraloy (#45 U.S.).

3. The composition of claim 1 wherein said pepper is included in an amount based on weight of from about 0.0001% to about 0.005% of the composition.

4. The composition of claim 3 wherein said amount is not more than about 0.0002%.

5. The composition of claim 1 wherein said pepper is dispersed in said composition by use of a distributing agent.

6. The composition of claim 5 wherein said distributing agent also bulks said pepper in said composition.

7. The composition of claim 6 wherein said distributing agent is red clover powder.

8. The composition of claim 5 wherein from about 20% to about 30% of the total amount of said pepper is dispersed in said composition as a base ingredient mixed therein before encasing, and from about 70% to 80% of the total amount of pepper is included as a top dressing applied after said composition has been encased.

9. The composition of claim 8 wherein the amount of pepper in said composition as an ingredient is about 25% of the total amount of pepper and the amount of pepper in said top dressing is about 75% of the total amount of pepper.

10. The composition of claim 8 wherein said top dressing comprises [describe functionally what the IFF Casing Pwd. G3588996 provides] and said pepper in an amount of from about 0.01% to about 0.08% by weight of said top dressing formula.

11. The composition of claim 1 wherein said heat content is from about 10,000 to about 40,000 BTU's.

12. The composition of claim 11 wherein said heat content is about 20,000 BTU's.

13. A process for preparing a composition for human use which provides a sustained organoleptic bite sensation, said composition including a nicotine-free herb capable of being encased, and a casing material applied thereto which provides a moist coherent cud in the oral cavity upon use, comprising: including cayenne pepper having a level of grind from about #30 Duraloy (#20 U.S.) to about #58 Duraloy (#48 U.S.), said pepper added to said composition in a stepwise manner, at least a first portion being added as an ingredient to said composition prior to encasing said composition and at least a second portion being applied to said composition as a top dressing after encasing said composition.

14. The process of claim 13 wherein said level of grind is about #54 Duraloy (#45 U.S.).

15. The process of claim 13 wherein said pepper has a level of heat of from about 10,000 to about 40,000 BTU's.

16. The process of claim 13 wherein said level of heat is about 20,000 BTU's.

17. The process of claim 13 wherein said composition is a nicotine-free herb capable of being encased, and a casing material applied thereto which provides a moist coherent cud in the oral cavity upon use, and said pepper is included in an amount of from about 0.0001% to about 0.005% of the overall weight of said composition, said at least first portion being from about 20% to about 30% by weight of the total amount of said pepper and said at least second portion being from about 70% to about 80% by weight of the total amount of said pepper.

18. The process of claim 13 wherein said at least second portion is combined with a distributing agent for dispersing said pepper substantially evenly throughout said composition.

19. The process of claim 18 wherein said distributing agent is included in an amount of from about 2 to about 12 parts of agent per 1 part of pepper.

20. The process of claim 19 wherein said agent is included in a ratio of 10 parts to 1 part of pepper.

21. The process of claim 13 wherein said at least first portion is mixed with a base mixture followed by encasing with a casing material having a binder, a humectant, and a preservative.

22. The process of claim 20 wherein said top dressing is applied by sprinkling on said encased base mixture after bulking.

* * * * *